July 25, 1967 C. J. PENK 3,332,731
TRAILER HITCH REFLECTOR
Filed April 15, 1963
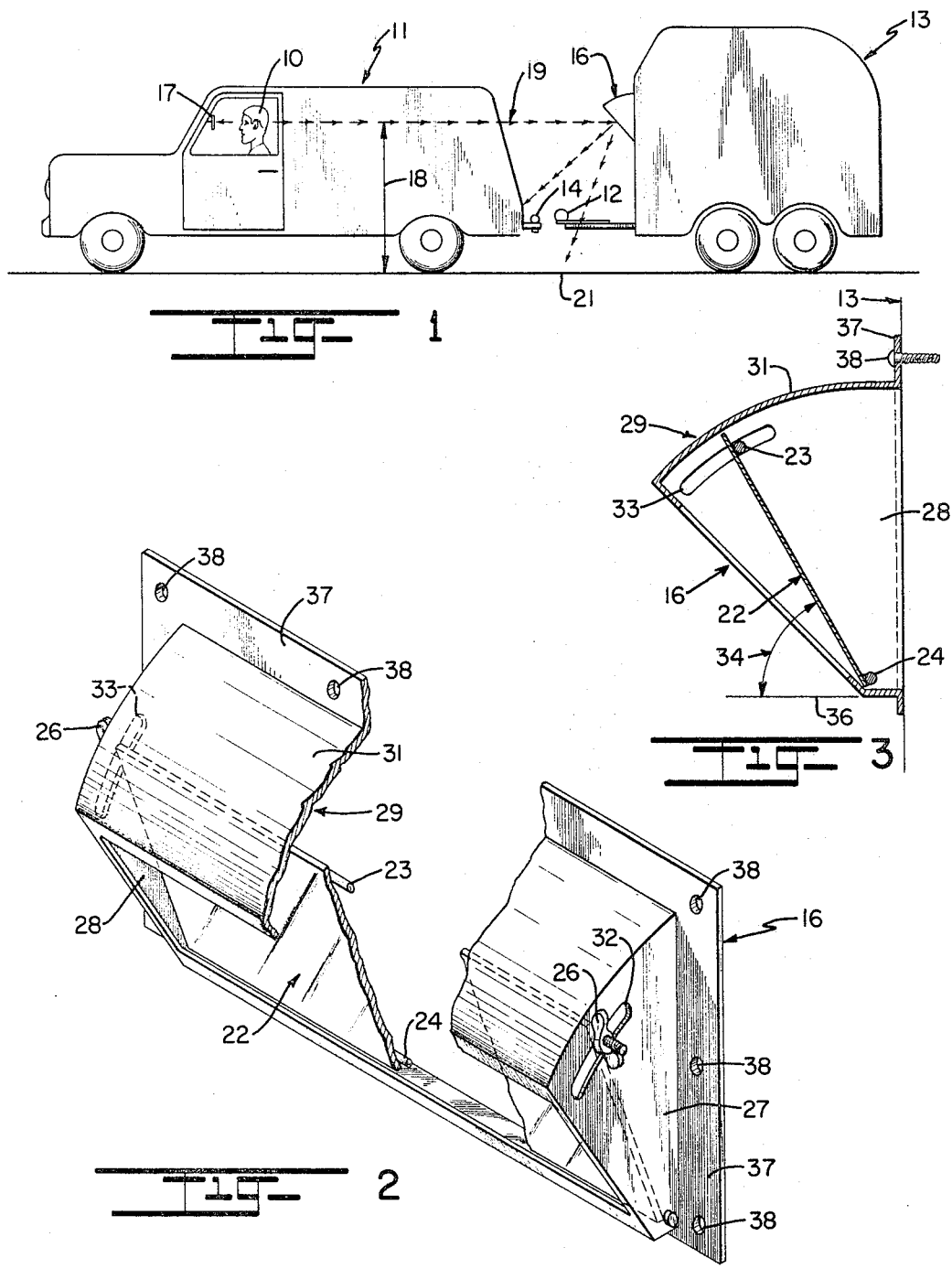
INVENTOR.
CONRAD J. PENK
BY
Philip H. Sheridan
ATTORNEY

United States Patent Office 3,332,731
Patented July 25, 1967

3,332,731
TRAILER HITCH REFLECTOR
Conrad J. Penk, 506 Arapahoe Ave.,
Boulder, Colo. 80302
Filed Apr. 15, 1963, Ser. No. 273,063
1 Claim. (Cl. 350—302)

This invention relates to a mirror or specular reflector, and particularly to a mirror adapted for attachment and adjustment on the front end of a trailer or drawn vehicle.

A difficult and perplexing problem is encountered by the driver of a draft vehicle when he is required, single-handedly, to align a ball hitch at the rear of the draft vehicle with a trailer hitch coupling at the front of the drawn vehicle while seated in the driver's seat of the draft vehicle. The driver, without assistance from another person, is forced to resort to trial and error, and to attempt to line up both couplings by sheer judgment. Invariably, under such circumstances, it becames necessary for the driver to maneuver and step in and out of the draft vehicle several times to observe the error in his trial alignment, and attempt to correct the alignment error before a satisfactory alignment has been accomplished. Even when an assistant is available to observe the two couplings, and to signal to the driver, the driver has difficulty in interpreting the assistant's more or less inaccurate instructions and efficiently maneuvering the draft vehicle so that the couplings are precisely aligned in a minimum period of time.

Accordingly, it is an important object of this invention to provide a drawn vehicle mirror, or reflector, which will facilitate the attainment of alignment of the couplings of a draft vehicle and a drawn vehicle.

Additional objects of the invention will become apparent from the following description, which is given primarily for purposes of illustration, and not limitation.

Stated in general terms, the objects of this invention are attained by providing a mirror reflector device which is adapted for mounting on a drawn vehicle, such as the front end of a trailer. The reflector device includes a mirror element, which preferably is elongate in a horizontal direction. The mirror element preferably is pivotally mounted in a partial encloseure having a top, or roof, and vertical sides, but uncovered in front. The mirror element is pivotally mounted so that its angle of inclination to the horizontal can be adjusted, preferably by having one of its horizontal edges, such as its lower edge, pivotally mounted in the vertical sides of the enclosure, and its other horizontal edge, such as its upper edge, adapted for fixing in position at a desired angle of inclination, such as by a wing nut and slot arrangement at the vertical sides of the enclosure. The reflector device includes mounting means, such as a mounting flange attached to the rear of the partial enclosure, for mounting the device on the front end of a trailer for reflecting an image of a hitch coupling at the front end of the trailer forward for guidance of a driver of a draft vehicle, while he is engaged in aligning a hitch at the rear of the draft vehicle with a hitch coupling at the front end of the trailer.

A more detailed description of a specific embodiment of the invention is given below with reference to the accompanying drawing, wherein:

FIG. 1 is a schematic side elevational view showing a mirror reflector device of the invention mounted on the front end of a trailer and reflecting an image of a hitch coupling of the trailer and a hitch of a truck forward to the line of sight of the driver of the truck;

FIG. 2 is an isometric view, with portions cut away, showing the mirror reflector device; and FIG. 3 is a vertical sectional view of the mirror reflector device of FIG. 2.

Upon referring to FIG. 1 it will be seen that a driver 10 seated in the draft vehicle 11 can directly view and control an alignment of the hitch coupling 12 of the trailer 13 with the hitch 14 of the draft vehicle, or truck 11, and achieve an accurate alignment of the coupling members in one operation by the use of the reflector device 16, through the conventional rear view mirror 17. The reflector device 16 is provided with mirror adjustment means, described below, so that the angle of inclination of a mirror in the reflector device can be adjusted for use with different draft vehicles 11 having different distances 18 between the line of sight 19 of the driver 10 and the ground 21. For example, distance 18 generally would be less when draft vehicle 11 is a passenger car than when the draft vehicle is a pick-up truck. Proper angular adjustment of the mirror in reflector device 16 compensates for such differences in distance 18.

The construction of reflector device 16 is shown in FIGS. 2 and 3. An elongate, rectangular mirror 22, preferably made of stainless steel, is provided with an adjustment rod 23 at the upper horizontal side thereof, and a pilot rod 24 along the lower horizontal side. Rods 23 and 24 can be attached to mirror 22 in any suitable manner, such as by welding, bolting, riveting, etc., or by making equivalent members integral with the mirror. The ends of rod 23 are threaded for threaded engagement of wing nuts 26, and the ends of rod 24 are pivotally mounted in apertures through the vertical sides 27 and 28, of partial enclosure 29, by means of rivet heads, or equivalent enlarged ends.

Partial enclosure 29 is of generally triangular vertical cross-section. It is provided with a downwardly sloping curved roof, or top 31, and vertical sides 27 and 28 integral with, or attached to the top. The top and sides protect mirror 22 from dirt, rain, snow and injury or damage. Sides 27 and 28 are apertured to receive the ends of rod 24, as pointed out above. Vertical sides 27 and 28 also are provided with arcuate slots 32 and 33, respectively, formed on a radius with the axis of rod 24, as best shown in FIG. 3. The angle of inclination 34, of mirror 22 to the horizontal 36, is adjusted to the desired value, to compensate for changes in distance 18, as discussed hereinabove with reference to FIG. 1, by loosening wing nuts 26, pivoting the mirror around pivot rod 24 to the desired angle of inclination, and then again tightening the wing nuts. It will be understood, however, that other means for adjusting angle 36 and fixing the position of mirror 22 can be used, such as a screw and knob arrangement, a crank-handle arrangement, etc.

A frame, or mounting flange 37, is formed integrally with partial enclosure 29, or is attached thereto by any suitable means, such as welding, brazing, soldering, etc. Mounting flange 37 is used to mount reflector device 16 to the face of drawn vehicle, or trailer 13. This can be accomplished by any suitable means, such as by the use of screws or bolts 38, rivets, welding, etc. Alternatively, reflector device 16 can be mounted in a recess formed in drawn vehicle 13 where provisions are made for accommodating the reflector device at an established distance above ground level, preferably at a horizontal lever with rear view mirror 17, located in front of, and adjacent the driver 10 of draft vehicle 11, as shown in FIG. 1. It will be understood that the reflector device of this invention is applicable to all drawn vehicles, in connection with the operation of which, a hitching operation is necessary. This includes vehicles operating on rails, in tracks, etc., as well as on roads, in yards, etc.

Obviously, many other modifications and variations of the drawn vehicle reflector of the present invention are possible in the light of the teachings given hereinabove. It is, therefore, to be understood that, within the scope of the appended claim, the invention can be practiced otherwise than as specifically described.

What is claimed is:

In combination with a reflecting mirror mounted on a draft vehicle, a reflector apparatus and a portion of a hitching apparatus attached to the front end of a drawn vehicle, said reflecting mirror, reflector apparatus and portion of said hitching apparatus being positioned in an optical line of sight whereby said reflector apparatus on said drawn vehicle continuously reflects toward said reflecting mirror an image of at least a portion of said hitching apparatus when said vehicles are so positioned as to provide said optical line of sight, said reflector apparatus comprising: a back plate for atttachment to the front of the drawn vehicle; an enclosure section having triangular shaped ends and a curved roof attached to said back plate with the roof uppermost; a reflector plate hingedly mounted at the bottom of said back plate to swing through an arc with the mounting point as the center; corresponding slots in said ends curved to correspond to said arm; a positioning rod attached near the top of said reflector plate extending longitudinally thereof with its end riding in said slots; and means for securing said positioning rod in a selected position in said slots.

References Cited
UNITED STATES PATENTS

| | | | |
|---|---|---|---|
| 1,444,538 | 2/1923 | Crooks | 88—86 |
| 1,872,905 | 8/1932 | Darling | 88—86 |
| 2,075,900 | 4/1937 | Jackson | 88—86 |

JEWELL H. PEDERSEN, *Primary Examiner.*

W. L. SIKES, *Assistant Examiner.*